March 8, 1960 C. A. SERRIADES 2,927,647
JET-PROPELLED PROPELLER BLADE
Filed Nov. 1, 1955
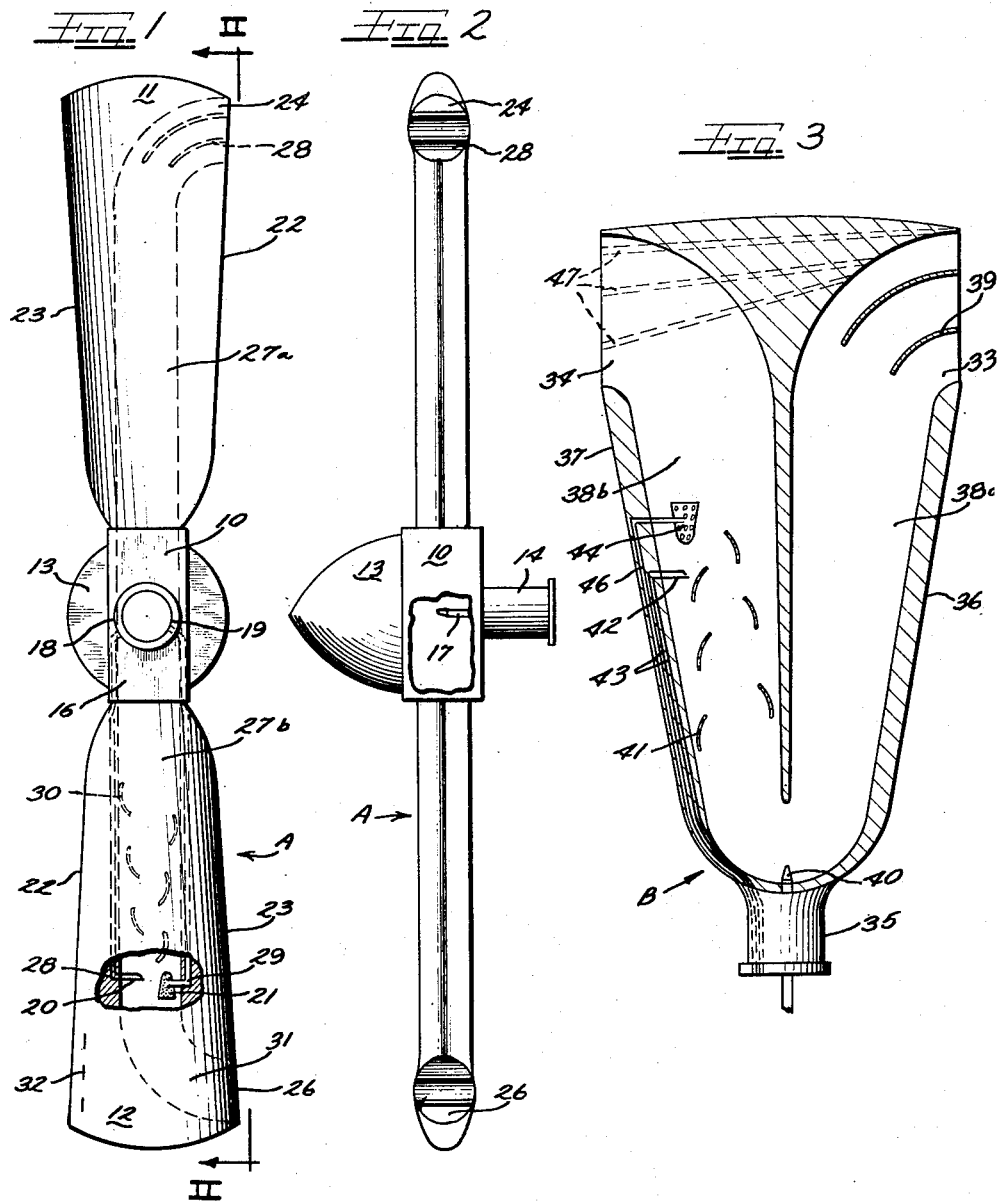
Inventor
CONSTANTINE A. SERRIADES
By
Attys

2,927,647

JET-PROPELLED PROPELLER BLADE

Constantine A. Serriades, Chicago, Ill.

Application November 1, 1955, Serial No. 544,158

13 Claims. (Cl. 170—135.4)

This invention relates to a jet-propelled propeller. Specifically, this invention relates to a propeller in which an integral jet propulsion system, formed in the hollow central portion of the blades is used to provide a jet thrust for rotation.

In propeller driven aircraft, and more recently in the development of helicopters and rotary winged aircraft, power has usually been supplied to the lift or thrust producing members by an independent prime mover such as a reciprocating engine. As some form of gearing is usually incorporated between the engine and thrust device, the combined weight of the engine and gearing exceeds that of the thrust producing device many times.

In addition, the use of a separate power unit for the thrust producing device necessarily involves a more complex control structure and maintenance problem, as well as a corresponding higher unit cost.

The present invention eliminates or substantially reduces many of these difficulties by providing a novel combination power source and rotary thrust producing device, as an integrated unit, which is light in weight, of a simple construction, and presents little or no maintenance problems due to the total absence of moving parts.

Briefly described, the present invention contemplates the provision of a jet propulsion system being co-operatively integrated in the hollow portion of a propeller blade or other rotary structure. An air inlet and outlet in the periphery of the rotating element are in communication with each other by a passage, or series of passages, which are in radial alignment with the blade axis and serve to compress the air passing therethrough by the coaction of the passage configurations and the centrifugal force generated by the blade rotation. Provision is further made for a fuel addition, mixing, and injection system, near the blade outlet to further augment the jet thrust from the outlet.

The air inlet may be provided with guide vanes to turn the entering air into the compression passages with a minimum of turbulence.

The compression passages have their longitudinal axes generally parallel to the blade axis. They may be of uniform or varying cross-sectional area in order to obtain the maximum compression advantage. Guide vanes may also be provided at the high velocity turning points to minimize turbulence and energy losses.

The last compression passage contains fuel addition means such as a fuel injector, carburetor, or similar device. To insure sufficient mixing of the fuel and air, a mixing means such as baffles or agitation points are also provided in the last compression passage.

A combustion chamber registers with the last compression stage and contains a suitable igniter for the fuel charge such as a flame holder or spark plug. A spark plug or spark gap may also be used to initially start the combustion or until a secondary ignition system becomes operative.

A magneto, fuel pump, starter, and other accessories and controls may be housed in a nacelle adjacent the propeller or in some other convenient location.

Thus it will be appreciated that the present invention discloses a novel combination propeller and jet propulsion system which overcomes many of the deficiencies of the separate component construction used currently.

In addition to its large weight saving characteristics, as contrasted to the conventional propeller-engine combination, the present invention contains far fewer working parts, is of relatively simple construction and can be used as a primary or secondary power source. Inasmuch as a jet thrust is utilized to rotate the propeller, which type of propulsion system is more efficient at relatively high operating speeds and altitudes, the present invention would serve to appreciably extend the useful operating range of a conventional propeller-engine combination by making possible the use of much smaller primary engine units, the jet thrust developed according to the principles of this invention being sufficient to maintain cruising speed once the desired altitude is reached.

If used as a supplementary power source the instant invention would make possible higher cruising speeds and altitudes with a relatively small increase in specific fuel consumption. Servicing and maintenance are simplified due to total absence of moving parts.

It is an object then of the present invention to provide an improved propeller structure having an integral jet propulsion system as a rotative power source.

Another object of the present invention is to provide an improved power source for the rotating thrust-producing members of an aircraft in the form of an integral jet propulsion system eliminating the need of an additional power source.

A further object of the present invention is to reduce the weight of the combined propeller-engine power plant in aircraft.

Yet another object of the present invention is to provide an improved power plant for a rotating propeller blade structure which is simple to manufacture, operate, and maintain as contrasted to conventional power sources.

A still further object of the present invention is to provide a compact combination propeller-jet propulsion system for aircraft in which the accessories and controls are readily accessible and interchangeable.

Many other objects and advantages of the present invention will become manifest to those versed in the art upon making reference to the detailed description which follows and the accompanying sheet of drawings.

On the drawings:

Figure 1 is a somewhat diagrammatic front elevation view of a propeller assembly embodying the principles of this invention, and showing a propulsion system integrated with two axially aligned blades;

Figure 2 is a somewhat diagrammatic side elevation view of the propeller assembly viewed along the line II—II of Figure 1; and Figure 3 is a diagrammatic longitudinal sectional view of a single propeller blade assembly showing a modified form of the invention.

As shown on the drawings:

In Figs. 1 and 2, the propeller A is comprised of a central hub 10, receiving a pair of blades 11 and 12. A spinner 13 encloses pitch control means (not shown) to regulate the angle of attack of the blades 11 and 12 with varying flight and load conditions. A propeller shaft 14 is suitably secured to the hub 10 and serves as a driving means for the various accessories and as a connection to a starter or other initially energizing device.

The hub 10 has a hollow central portion in axial alignment with the blades 11 and 12, as at 16, which encloses a fuel addition or injection means 17, as best shown in Fig. 2, whose purpose and function will be more fully explained later. Also included in the hub 10 are conduit means 18 and 19 for a starting ignition system 20 and a flame holder 21, respectively, whose functions will also be more fully explained later.

The blades 11 and 12 include a leading edge portion 22 and a trailing edge portion 23, and extend radially outwardly from the hub 10 in axial alignment with each other. Suitable journaling means in the hub 10 also permit a limited axial rotation of the blades in response to a pitch control device (not shown).

An inlet 24 in the blade 11 is communicated with an outlet 26 in the blade 12 by internal transverse passageways 27a and 27b in the central hollow portion of the blades 11 and 12. Guide vanes 28 in the inlet 24 serve to turn incoming air into the internal passageway 27 with a minimum of turbulence or energy loss.

It will be appreciated that air entering the inlet 24 and moving down the passageway 27a toward the hub 10 is subject to the generated centrifugal force of the blade rotation. The passage 27a in the blade 11 is therefore formed to minimize the centrifugal force effect on the air being communicated therethrough by optimizing the cross sectional area of the passage relative to the inlet and air flow. The internal wall surfaces of the passageway 27a are also smooth and polished to minimize duct losses.

After the air has reached the hub 10, a metered quantity of fuel is added by the fuel injector 17 according to the speed and load requirements of the propeller A.

The blade 12 is in axial alignment with the blade 11 and encloses a continuation of the passageway 27b, communicating with the outlet 26. The solid blade portions adjacent the passageways 27b communicate the ignition conduit 18 and flame holder fuel passage conduit 19 to separate downstream points 28 and 29, respectively, substantially near the outlet 26. A plurality of baffles or agitators 30, in the passageway 27b, serve to mix the fuel and air before reaching the flame holder 21.

The starting ignition system 20 in the passageway 27b, may be in the form of a spark plug or spark gap device, its only function being to initially ignite the fuel-air mixture before the flame holder 21 becomes operative.

The flame holder 21 is the primary ignition system for the fuel-air mixture and receives fuel from a bleed passageway in the solid portion of the blade 12 which communicates with the main fuel injection system 17. A continuous quantity of fuel is therefore metered to the flame holder 21 to maintain a continuous flame front at some predetermined optimum point in the passageway 27b, near the outlet 26.

A combustion chamber 31 is formed in the end of the passage 27b which communicates with the outlet 26 in the trailing edge portion 23, and also serves to turn the air into a tangential jet exhaust, thereby providing thrust to rotate the propeller A.

It will be appreciated that air in the downstream passageway 27b will receive a beneficial velocity increase due to the centrifugal force of the rotating blade 12, further serving to augment the jet velocity at the outlet 26.

A plurality of cooling ducts 32 in the leading edge portion 22 of the blade 12, communicate air at atmospheric temperature around the combustion chamber 31, thereby cooling the combustion chamber and adjacent blade area.

Thus it will be seen that the blades 11 and 12 serve the dual function of providing a thrust through the rotation of their aerodynamically shaped surfaces, and contain their own power source by providing a tangential jet thrust out of the trailing edge of one of the blades, which induces rotation of the propeller assembly.

In operation, the propeller A is initially rotated by a starter or accumulator suitably engaged to the shaft 14. An air flow is thereby induced through the inlet 24 to the upstream passageway 27a. Upon reaching the hub 10, a metered quantity of fuel is sprayed or injected into the air by the injector 17. After passing into the downstream passageway 27b, the flow velocity is augmented by the centrifugal force of the blade rotation. The fuel-air mixture passes through the baffles 30 to receive an additional mixing and then is ignited by the spark gap 20 to establish a flame front. The flame front immediately serves to ignite the bleed fuel in the flame holder 21, thereby permitting a continuous ignition of the mixture without the spark gap. The air, at a much increased temperature and pressure is turned through the outlet 26 to issue as a tangential jet in the trailing edge portion 23 of the blade 12, thereby providing the rotating means for the propeller A. The cooling ducts 32 communicate cool air around the combustion chamber 31 to prevent excessive temperatures from arising.

Referring now to Fig. 3, a modification of the present invention is illustrated, wherein the entire propulsion system is incorporated in a single blade, and where the same reference numerals will be used to identify identical parts.

In Fig. 3 the blade assembly is designated generally by the reference letter B. The blade B has a generally aerodynamic shape and includes a hub 35, a leading edge portion 36, a trailing edge portion 37, and a peripheral inlet 33 and outlet 34 in the respective leading and trailing edge portions 36 and 37. The inlet 33 communicates with an upstream passageway 38a, and the outlet 34 communicates with a downstream passageway 38b, both passageways being formed in the hollow internal portion of the blade B, thereby effecting a continuous flow path between the inlet 33 and outlet 34.

A plurality of guide vanes 39 in the inlet 33 serve to turn air into the upstream passageway 38a with a minimum of turbulence and duct losses, as in the embodiment shown in Figs. 1 and 2.

The passages 38a and 38b differ from the embodiment shown in Fig. 1 in that they are both contained in a single blade, describing a somewhat U-shaped configuration, thereby affording a more compact arrangement, and making possible a complete propulsion system in a single blade element.

The upstream passage 38a is formed similarly to the upstream passage 27a of Fig. 1, in that its cross-sectional area and wall smoothness are optimized to reduce the effects of skin friction and centrifugal force due to the rotation of the blade.

A fuel injector or spray nozzle 40, positioned in the loop of the U-shaped passages 38a and 38b supplies fuel to air moving into the accelerating passage 38b, thereby achieving a mixing effect due to the increased velocity and reduction in pressure of the air.

The resulting fuel-air mixture is further mixed by a plurality of staggered baffles or agitation points 41, immediately downstream of the fuel injector 40.

The fuel-air mixture is initially ignited by a spark gap or spark plug 42. The spark gap 42 is energized through connecting conduits 43 in the solid portion of the blade B which communicate with some high voltage source. It will be appreciated that though the spark gap 42 is primarily a starting ignition system, it may still be used as a primary or stand-by means of ignition in the event of failure of the primary ignition system.

A flame holder 44, positioned somewhat downstream of the mixing baffles 41 and spark gap 42, constitutes the primary ignition system for the fuel-air mixture in the passage 38b. A small quantity of fuel is bled from the main fuel source through a communicating passage 46 to the flame holder 44 and is there ignited by the flame front established from the spark gap ignition. Once a flow is established in the passage 38b, the bleed fuel in the flame holder 44 will continuously burn and ignite the fuel-air mixture, independent of the spark gap 42.

After being ignited by the flame holder 44, the air is turned tangentially through the outlet 34 as a high velocity jet exhaust, due to the increased temperature and pressure of the combustion process and the nozzle effect of the outlet 34. A jet thrust is thereby produced which serves to rotate the blade B and correspondingly produce a thrust force due to the aerodynamic configuration of the blade B.

A plurality of cooling ducts 47 communicate cool inlet air around the outlet 34, to reduce heating of the blade tip.

In operation, the blade B is initially rotated by some starting means to induce an air flow through the inlet 33 into the passage 38a. Due to centrifugal force effects, the air will be slowed down as it moves toward the hub 35, with a corresponding increase in pressure. On reaching the loop between the passages 38a and 38b, a metered quantity of fuel is sprayed into the air flow. As the fuel-air mixture then begins to move toward the outlet 34, the centrifugal force of the blade rotation accelerates the flow, producing a pressure drop and mixing action. A series of staggered baffles 41 immediately downstream of the fuel injector 40, serve to further mix the fuel and air. The spark gap 42 then initially ignites the mixture until the flame holder 44 becomes operative. The flame holder 44 receives bleed fuel from the main fuel source, which continues to burn and ignite the advancing fuel-air mixture. After combustion, the air mass, at a much increased pressure and velocity, is turned tangentially out of the outlet 34 as a high velocity jet, thereby producing a thrust to rotate the blade B.

Thus it will be appreciated that the modification of the present invention shown in Fig. 3 is readily adaptable to the larger type of propeller blades where there is a sufficient blade width to accommodate both the inlet and outlet and connecting passages in a single blade. It should further be appreciated that the axial arrangement of the connecting passages, relative to the blade axis, serve to utilize the centrifugal force generated by the blade rotation as a means for mixing fuel with the air in the passages, and also as a pressurizing means when the mixture is moving toward the blade tip.

It will be understood that modifications and variations may be effected without departing from the scope of the novel concepts of the present invention.

I claim as my invention:

1. A propeller structure having a hub and hollow blade portions including an outlet and a tangential inlet remote from said hub and containing an internally integral jet propulsion system formed in the hollow internal portions of the propeller blade, said inlet being continuously open and said jet propulsion system providing a continuous air flow from the inlet to the hub to the outlet and a jet thrust to rotate said propeller structure.

2. A jet propulsion system integral with a propeller structure comprised of a plurality of hollow radial blades extending from a central hub member, leading and trailing edge portions on said blades, a continuously open tangential air inlet in the leading edge of one of the blades remote from said hub, a tangential jet exhaust outlet in the trailing edge of one of the blades, said inlet and outlet being in communication by virtue of a radial flow passage in the hollow internal portion of the blades and receiving a continuous air flow therethrough from the inlet to the hub to the outlet, means generally midway of the radial flow passage for supplying fuel to air flowing from the inlet to the outlet, and means downstream of said last-named means for igniting the fuel to provide a jet exhaust through the outlet.

3. A jet propulsion system integral with a propeller structure comprised of a plurality of hollow radial blades extending from a central hub member, leading and trailing edge portions on said blades, a tangential inlet in the leading edge of one of said blades remote from said hub member, a tangential jet exhaust outlet in the trailing edge of one of said blades, said inlet being continuously open, a radial flow passage in the hollow internal portion of the blades communicating with said inlet and with said jet exhaust outlet and receiving a continuous air flow therethrough of substantially constant pressure from the inlet to the hub to the outlet, fuel supply means located generally midway between the inlet and the outlet directing fuel to the air flowing in the radial passage, and ignition means between the fuel supply means and the outlet for igniting the fuel to provide a jet thrust through the outlet.

4. A jet propulsion system, integral with a propeller structure comprised of a plurality of hollow radial blades extending from a central hub member, leading and trailing edge portions on said blades, a continually open tangential air inlet in the leading edge of one of the blades remote from said hub member, a tangential jet exhaust outlet in the trailing edge of one of the blades, a radial flow passage in the hollow internal portion of the blades having an upstream portion communicating said inlet and a downstream portion communicating with the jet exhaust outlet and receiving a continuous air flow therethrough from the inlet to the hub to the outlet, means in said hub member for supplying fuel to air flowing through said blades, means for initially igniting said fuel, and means for continuously igniting said fuel to provide a jet exhaust through said tangential jet exhaust outlet.

5. A propeller structure having at least one hollow aerodynamically-shaped radial blade extending from a central axis, an integral jet propulsion system in said blade, said blade having a leading and trailing edge and a blade tip, a continuously open tangential air inlet in said leading edge substantially at the tip of said blade, a tangential jet exhaust outlet in said trailing edge, a generally U-shaped radial flow passage in the hollow internal portion of said blade, a decelerating arm portion of said U-shaped flow passage communicating with the air inlet, an accelerating arm portion of said U-shaped flow passage communicating with the jet exhaust outlet, means at the base of the U-shaped flow passage for supplying fuel to air flowing through said U-shaped flow passage, and means in the accelerating arm portion of the flow passage for igniting said fuel to produce a jet exhaust out of said outlet thereby causing said propeller structure to rotate.

6. A propeller structure having at least one hollow aerodynamically-shaped radial blade extending from a central axis, an integral jet propulsion system in said blade, said blade having a leading and trailing edge, and a blade type, a tangential air inlet in said leading edge substantially at the tip of said blade, a tangential jet exhaust outlet in said trailing edge, guide vanes in said air inlet, a generally U-shaped radial flow passage in the hollow internal portion of said blade having its arm portions generally parallel to the principal axis of said blade, a decelerating arm portion of said U-shaped flow passage in communication with the air inlet, an accelerating arm portion of said U-shaped flow passage in communication with the jet exhaust outlet, said decelerating arm portion and accelerating arm portion having optimum varying cross sectional areas for said air flow, means at the base of the U-shaped flow passage for supplying fuel to air flowing through said U-shaped flow passage, and means in the accelerating arm portion of the flow passage for igniting said fuel to produce a jet exhaust out of said outlet rotating said propeller structure.

7. A propeller structure having at least one hollow aerodynamically-shaped radial blade extending from a central axis, an integral jet propulsion system in said blade, said blade having a leading and trailing edge, a tangential air inlet in said leading edge remote from the axis of rotation of the blade, a tangential jet exhaust outlet in said trailing edge, guide vanes in said air inlet, a generally U-shaped radial flow passage in the hollow of the internal portion of said blades, a decelerating arm portion of said U-shaped flow passage in communication with the air inlet, an accelerating arm portion of said U-shaped flow passage in communication with the jet exhaust outlet, cooling parts in said air inlet communicating inlet air around said jet exhaust outlet, means between the accelerating and decelerating arm portions for supplying fuel to air flowing through said U-shaped flow passage, and means in the accelerating arm portion for igniting said fuel to produce a jet exhaust out of said outlet rotating said propeller structure.

8. A propeller structure having at least one aerodynamically-shaped hollow blade member, an internally integral jet propulsion system in said blade member comprised of a generally U-shaped flow passage in said blade having decelerating and accelerating arm portions, a continuously open air inlet remote from the axis of rotation of said blade registering with said decelerating arm portion, a jet exhaust outlet registering with said accelerating arm portion, means at generally the juncture of the accelerating and decelerating arm portions for supplying fuel to air flowing through said U-shaped flow passage, and means in the accelerating arm portion for igniting said fuel to produce a jet exhaust out of said outlet, said jet propulsion system utilizing the centrifugal force developed by said blade rotation to increase the velocity of the jet exhaust out of said exhaust outlet.

9. A jet propulsion system integrally formed with a propeller structure comprising a plurality of hollow radial blades extending from a central hub member, said blades having leading and trailing edge portions formed thereon, each of said blades also having a continuously open tangential inlet formed in the leading edge thereof remote from said hub member and a tangential jet exhaust outlet in the trailing edge thereof, said blades including a radial flow passage defined in the hollow internal portions thereof communicating said inlet with said jet exhaust outlet and receiving a continuous air flow therethrough from the inlet to the hub to the outlet, means in said hub member for supplying fuel to air flowing in the radial flow passage through said blades, means for mixing said fuel with the air flowing through said blades, means for initially igniting said fuel, and means for continuously igniting said fuel to provide a jet exhaust through said jet exhaust outlet, said mixing means, said initial ignition means and said continuous ignition means being located in the radial flow passage and downstream of the fuel supply means.

10. A jet propulsion system, integrally formed with a propeller structure comprising a plurality of hollow radial blades extending from a central hub member, said blades having leading and trailing edge portions formed thereon, each of said blades also having a continuously open tangential inlet formed in the leading edge thereof remote from said hub member and a tangential jet exhaust outlet formed in the trailing edge thereof, said hollow blades defining a radial flow passage communicating said inlet with said jet exhaust outlet and receiving a continuous flow of air therethrough from the inlet to the hub to the outlet, means in said hub member for supplying fuel to the air flowing in the radial flow passage through said blades, means for mixing the fuel with the air flowing through said blades, means for initially igniting the fuel, means for continuously igniting the fuel to provide a jet exhaust through said jet exhaust outlet, and means for cooling said propeller structure in a zone adjacent the jet exhaust outlet, said mixing means, said initial ignition means and said continuous ignition means being located in the radial flow passage and downstream of the fuel supply means.

11. A propeller structure having an integral jet propulsion system formed therein comprising at least one hollow aero-dynamically shaped radial blade extending from a central hub, said blade having leading and trailing edge portions and a blade tip, said blade also having a tangential air inlet formed in the leading edge portion thereof, substantially at the blade tip, and a tangential jet exhaust outlet in the trailing edge of said blade, a generally U-shaped radial flow passage in the hollow internal portion of said blade having one decelerating arm portion communicating with the air inlet and the other accelerating arm portion communicating with the jet exhaust outlet, means for supplying fuel at the base of the U-shaped flow passage to air flowing therethrough, means in accelerating arm of said U-shaped flow passage for mixing the fuel with the air flowing therethrough, and means also in said accelerating arm for igniting said fuel to produce a jet exhaust out of said jet exhaust outlet to rotate the propeller structure.

12. A propeller structure having an integral jet propulsion system formed therein comprising at least one hollow aero-dynamically shaped radial blade extending from a central hub, said blade having leading and trailing edge portions and a blade tip, said blade also having a tangential air inlet formed in the leading edge portion thereof, substantially at the blade tip, and a tangential jet exhaust outlet in the trailing edge portion thereof, a generally U-shaped radial flow passage in the hollow internal portion of said blade having one decelerating arm portion communicating with the air inlet and the other accelerating arm portion communicating with the jet exhaust outlet, means at generally the juncture of said decelerating and accelerating arm portions for supplying fuel to air flowing through said U-shaped flow passage, means in the accelerating arm portion of said U-shaped flow passage for mixing the fuel with the air, and means in the accelerating arm portion of said U-shaped flow passage for igniting the fuel to produce a jet exhaust out of said jet exhaust outlet to rotate said propeller structure.

13. A propeller structure having an integral jet propulsion system formed therein comprising at least one hollow aero-dynamically shaped radial blade extending from a central hub, said blade having leading and trailing edge portions and a blade tip, said blade having a tangential air inlet formed in the leading edge portion thereof, substantially at the blade tip, and a tangential jet exhaust outlet in the trailing edge portion thereof, a generally U-shaped radial flow passage in the hollow internal portion of said blade having one decelerating arm portion communicating with the air inlet and one accelerating arm portion communicating with the jet exhaust outlet, means for supplying fuel at the loop of said U-shaped flow passage to air flowing therethrough, means in the accelerating arm portion of said U-shaped flow passage for mixing the fuel with the air, means in said accelerating arm portion for initially igniting said fuel, and means also in the accelerating arm portion of said U-shaped flow passage for continuously igniting said fuel to provide a jet exhaust out of said jet exhaust outlet to rotate said propeller structure.

References Cited in the file of this patent

UNITED STATES PATENTS

| | | |
|---|---|---|
| 2,397,999 | Goddard | Apr. 9, 1946 |
| 2,499,863 | Hart | Mar. 7, 1950 |
| 2,553,253 | Hays | May 15, 1951 |
| 2,644,301 | Karlby | July 7, 1953 |
| 2,651,376 | Stanitz | Sept. 8, 1953 |

FOREIGN PATENTS

| | | |
|---|---|---|
| 81,904 | Norway | June 8, 1953 |
| 1,059,108 | France | Nov. 10, 1953 |